United States Patent
Malkin et al.

(10) Patent No.: US 7,962,847 B2
(45) Date of Patent: Jun. 14, 2011

(54) METHOD FOR PROVIDING DYNAMIC PROCESS STEP ANNOTATIONS

(75) Inventors: Peter K. Malkin, Ardsley, NY (US); Thomas D. Erickson, Minneapolis, MN (US); Wendy A. Kellogg, Yorktown Heights, NY (US); Brent Tzion Hailpern, Katonah, NY (US); Lawrence D. Bergman, Mt. Kisco, NY (US); Vittorio Castelli, Croton on Hudson, NY (US); Daniel A. Oblinger, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 1279 days.

(21) Appl. No.: 11/254,976

(22) Filed: Oct. 20, 2005

(65) Prior Publication Data

US 2007/0094590 A1   Apr. 26, 2007

(51) Int. Cl.
    *G06F 17/00* (2006.01)
(52) U.S. Cl. ........ 715/230; 715/229; 715/232; 715/234; 715/751
(58) Field of Classification Search .................. 715/200, 715/202, 205, 229–234, 255, 256, 268, 273, 715/700, 727, 728, 751, 760; 709/201–203, 709/205, 217–219
See application file for complete search history.

(56) References Cited

U.S. PATENT DOCUMENTS

| | | | | |
|---|---|---|---|---|
| 5,513,305 A * | 4/1996 | Maghbouleh | ................. | 715/234 |
| 5,630,069 A * | 5/1997 | Flores et al. | ..................... | 705/7 |
| 5,787,175 A * | 7/1998 | Carter | .......................... | 713/165 |
| 6,018,716 A * | 1/2000 | Denardo et al. | .................. | 705/7 |
| 6,085,185 A * | 7/2000 | Matsuzawa et al. | .......... | 707/102 |
| 6,240,444 B1 * | 5/2001 | Fin et al. | ....................... | 709/205 |
| 6,342,906 B1 * | 1/2002 | Kumar et al. | .................. | 715/751 |
| 6,397,181 B1 * | 5/2002 | Li et al. | ....................... | 704/256.4 |
| 6,519,603 B1 * | 2/2003 | Bays et al. | ..................... | 707/102 |
| 6,564,246 B1 * | 5/2003 | Varma et al. | .................. | 709/205 |
| 6,687,878 B1 | 2/2004 | Eintracht et al. | ............. | 715/512 |
| 6,691,153 B1 * | 2/2004 | Hanson et al. | ................ | 709/204 |
| 6,785,676 B2 * | 8/2004 | Oblinger | .......................... | 707/5 |
| 6,952,660 B1 * | 10/2005 | Matheson | ........................ | 703/1 |
| 7,051,072 B2 * | 5/2006 | Stewart et al. | ................ | 709/204 |
| 7,225,397 B2 * | 5/2007 | Fukuda et al. | ................ | 715/230 |
| 7,424,717 B2 * | 9/2008 | Blevins | ........................ | 719/318 |

(Continued)

FOREIGN PATENT DOCUMENTS

WO   WO 0005647 A *   2/2000
WO   WO 01/90928 A1   11/2001

OTHER PUBLICATIONS

A. Amir et al., "Using Audio Time Scale Modification for Video Browsing", Video Use in Office & Education, 33th Hawaii Int. Conf. on System Sciences, HICSS-2000, Jan. 2000, pp. 1-10.*

(Continued)

*Primary Examiner* — Maikhanh Nguyen

(74) *Attorney, Agent, or Firm* — Michael J. Buchenhorner; Vazken Alexanian

(57) ABSTRACT

A system and method for obtaining a process definition; determining the current process; determining the current process step; determining whether a whether a user has requested creation or modification of an annotation of the current process or step; receiving information from the user for creating the annotation when a user has requested creation of an annotation; and displaying the annotation.

10 Claims, 5 Drawing Sheets

U.S. PATENT DOCUMENTS

| | | | |
|---|---|---|---|
| 7,627,631 B2* | 12/2009 | Blevins | 709/205 |
| 2002/0099552 A1* | 7/2002 | Rubin et al. | 704/270 |
| 2002/0133628 A1* | 9/2002 | Asplund et al. | 709/246 |
| 2004/0101903 A1* | 5/2004 | Rigoutsos | 435/7.1 |
| 2004/0205482 A1* | 10/2004 | Basu et al. | 715/500.1 |
| 2004/0205547 A1* | 10/2004 | Feldt et al. | 715/512 |
| 2004/0260702 A1* | 12/2004 | Cragun et al. | 707/100 |
| 2004/0260714 A1* | 12/2004 | Chatterjee et al. | 707/101 |
| 2005/0038788 A1 | 2/2005 | Dettinger et al. | 707/10 |
| 2005/0125716 A1* | 6/2005 | Cragun et al. | 715/512 |
| 2005/0234958 A1* | 10/2005 | Sipusic et al. | 707/102 |
| 2006/0053364 A1* | 3/2006 | Hollander et al. | 715/512 |
| 2007/0226023 A1* | 9/2007 | Das et al. | 705/7 |

OTHER PUBLICATIONS

M. Erdmann et al., "From Manual to Semi-automatic Semantic Annotation: About Ontology-based Text Annotation Tools", Processing of the COLING 2000 Workshop on Semantic Annotation and Intelligent Content, Luxembourg, Aug. 2000, pp. 1-7.*

R. Picard et al., "Vision Textual for Annotation", MIT Media Laboratory Perceptual Computing Section Technical Report No. 302, Multimedia Systems: Special Issue on Content-based Retrievel, pp. 1-13, No Date.*

Venu Vasudevan and Mark Palmer, "Object Service Architecture, Web Annotation Service, Project Summary," Sep. 15, 1998.

Durish, P., Edwards, W., Lamarca, Al, et al., "Extending Document Management Systems with User-Specific Active Properties," ACM Transactions on Information Systems, vol. 18, No. 2, Apr. 2000, pp. 140-170.

Lei, H., Chakraborty, D., Chang, H., et al., "Contextual Collaboration: Platform and Applications," Proceedings of the 2004 IEEE International Conference on Services Computing (SCC '04).

* cited by examiner

METHOD FOR PROVIDING DYNAMIC PROCESS STEP ANNOTATIONS

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to the field of user assistance and program annotations.

BACKGROUND OF THE INVENTION

Known printed and online user manuals provide step-by-step execution instructions, but (1) they cannot be altered by end-users, and (2) each relevant process step instruction does not appear dynamically as a given user executes the given process. Foe example, Microsoft's Office Assistant can offer context sensitive (i.e., dynamic) instructional help, but these instructions cannot be modified/customized by a given user; every user sees the same instructional help.

Web annotations, such as the Object Service Architecture, Web Annotation Service, provides a way for users to associate user-defined annotation (e.g., notes and comments) with web pages, the annotations and web pages provided by distinct network services but do not provide dynamic user-defined process step annotations (only web pages).

U.S. Pat. No. 6,687,878 discussed annotations of a document, not a process. WO0190928 discussed annotations of a word or group of words. United States Patent Application 2005/0038788 discussed preventing sensitive information from being divulged in an annotation. United States Patent Application US20030023679A1 (System and process for network collaboration through embedded annotation and rendering instructions) discussed a scheme that enables collaborators to work together on network accessible "collaboration content." This shared object includes a collaborator-specified annotation but it does not provide dynamic user-defined process step annotations.

A publication by Dourish, P., Edwards, W., Lamarca, A., Lamping, J., Petersen, K., Salisbury, M., Terry, D., and Thornton, J. "Extending Document Management Systems with User-Specific Active Properties,", ACM Transactions on Information Systems, Vol. 18, No. 2, April 2000, Pages 140-170 provides a method for collaborators to assign properties to documents and then have these properties used to manage the documents, the properties including sharing rights, versioning and annotations. No method is described, however, providing dynamic user-defined process step annotations, the method only describing how annotations can be associated with documents, not process steps. Also no method is provided to automatically detect when a given annotation should be displayed.

Contextual Collaboration, such as that described in Lei, H., Chakraborty, D., Chang, H., Dikun M. J., Heath, T., Li, J. S., Nayak, N., and Patnaik, Y. "Contextual Collaboration: Platform and Applications," Proceedings of the 2004 IEEE International Conference on Services Computing (SCC '04), IBSN 0-7695-2225-4/04, provides a method of providing collaborative applications (e.g., a chat session) when users reach particular states, particularly stages in business transactions. It does not, however, provide any means for an individual user to associate one or more annotations with a given process-step.

Thus, there remains a need for a system and method that allow a user to annotate the steps of a process and wherein the associated annotations appear automatically when the user re-executes the process in the future.

SUMMARY OF THE INVENTION

Briefly, according to an embodiment of the invention a method includes steps or acts of: obtaining a process definition; determining the current process and the current process step being executed; determining whether a user has requested the creation of an annotation of a process step; receiving information from the user for creating the annotation if the user has requested creation of an annotation; and creating the requested annotation using the information received from the user. In another embodiment, the annotations created are automatically displayed to a user when the method determines that the annotated process is being performed.

These methods can be implemented as machine executable instructions executed by a programmable information processing system or as a computing apparatus such as a programmable digital computer or an application-specific integrated circuit (ASIC).

DETAILED DESCRIPTION

A detailed description of an illustrative embodiments of the current invention are given, describing how to allow a user to create annotations for steps in a specified process specify and to execute the process, with the user's personal process step annotations being automatically displayed during this execution. Specifically, the embodiments discussed herein illustrate an example of the execution of a business trip reimbursement process.

Figure 1:
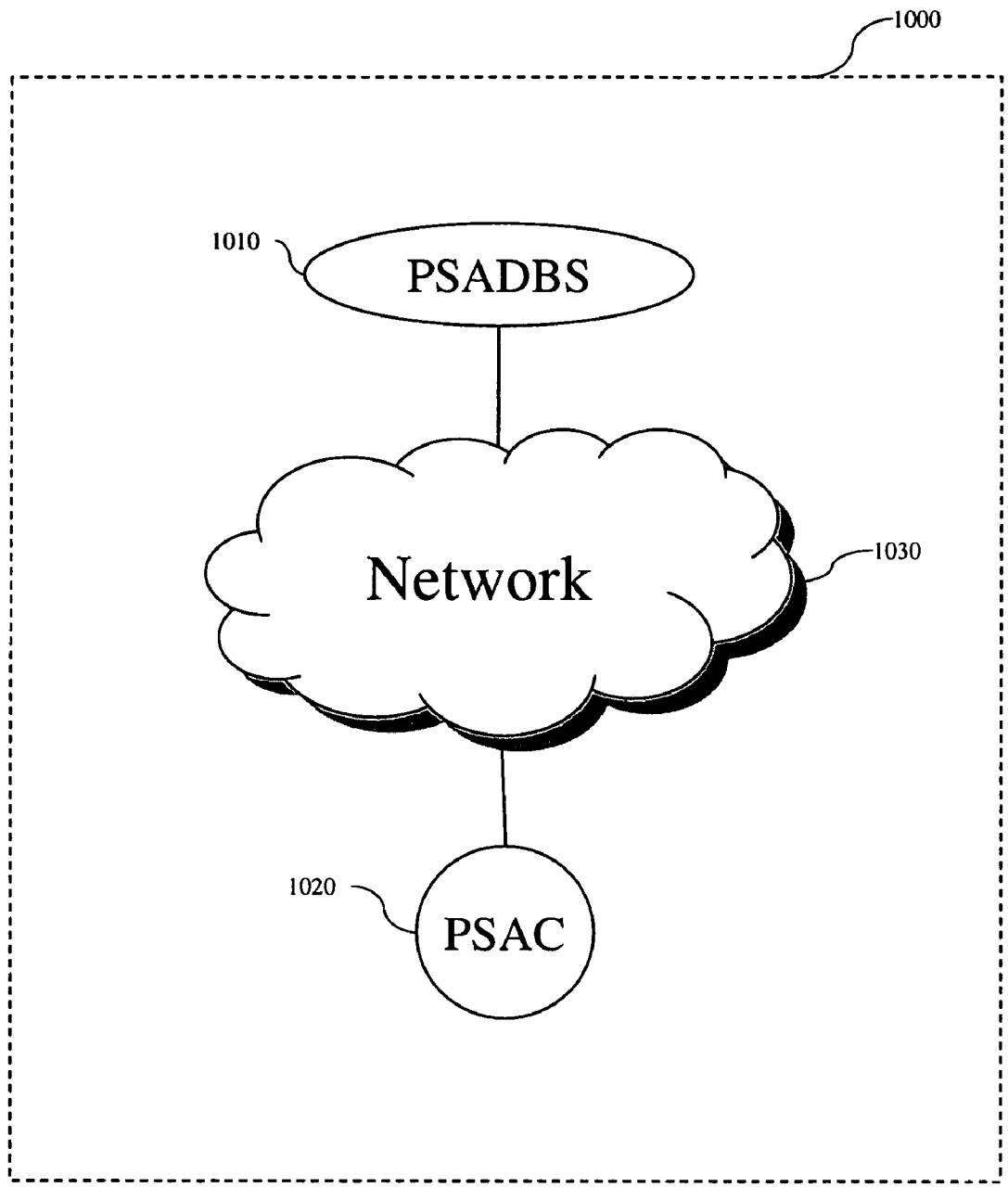
FIG. 1 is a block diagram showing an example network architecture including the major technology infrastructures of a system according to an embodiment of the invention.

FIG. 1 depicts an example network topology 1000 providing an execution environment implementing the functionality of this embodiment. As shown, the network topology includes a Process Step Annotation Database Server (PSADBS) 1010, and a Process Step Annotation Client (PSAC) 1020, which can communicate with each other through a network 1030.

The network 1000 includes, but is not limited to, the Internet, an internal intranet, or a wireless or wired telecommunications network.

The Process Step Annotation Database Server 1010 enables end-users to store and retrieve information relating to a process from network-connected Process Step Annotation Client 1020 nodes. Examples of platforms that support the Process Step Annotation Database Server 1010 include, but are not limited to, an IBM PowerPC running a Windows XP operating system, and IBM's DB2 database server product, which handles the storage and search of product-related information. As will be described in detail with reference to FIGS. 2-3, the data managed by the Process Step Annotation Database Server 1010 includes, but is not limited to, process definitions, and process instance execution statuses, i.e., the state of individual executions of given processes.

Figure 5:
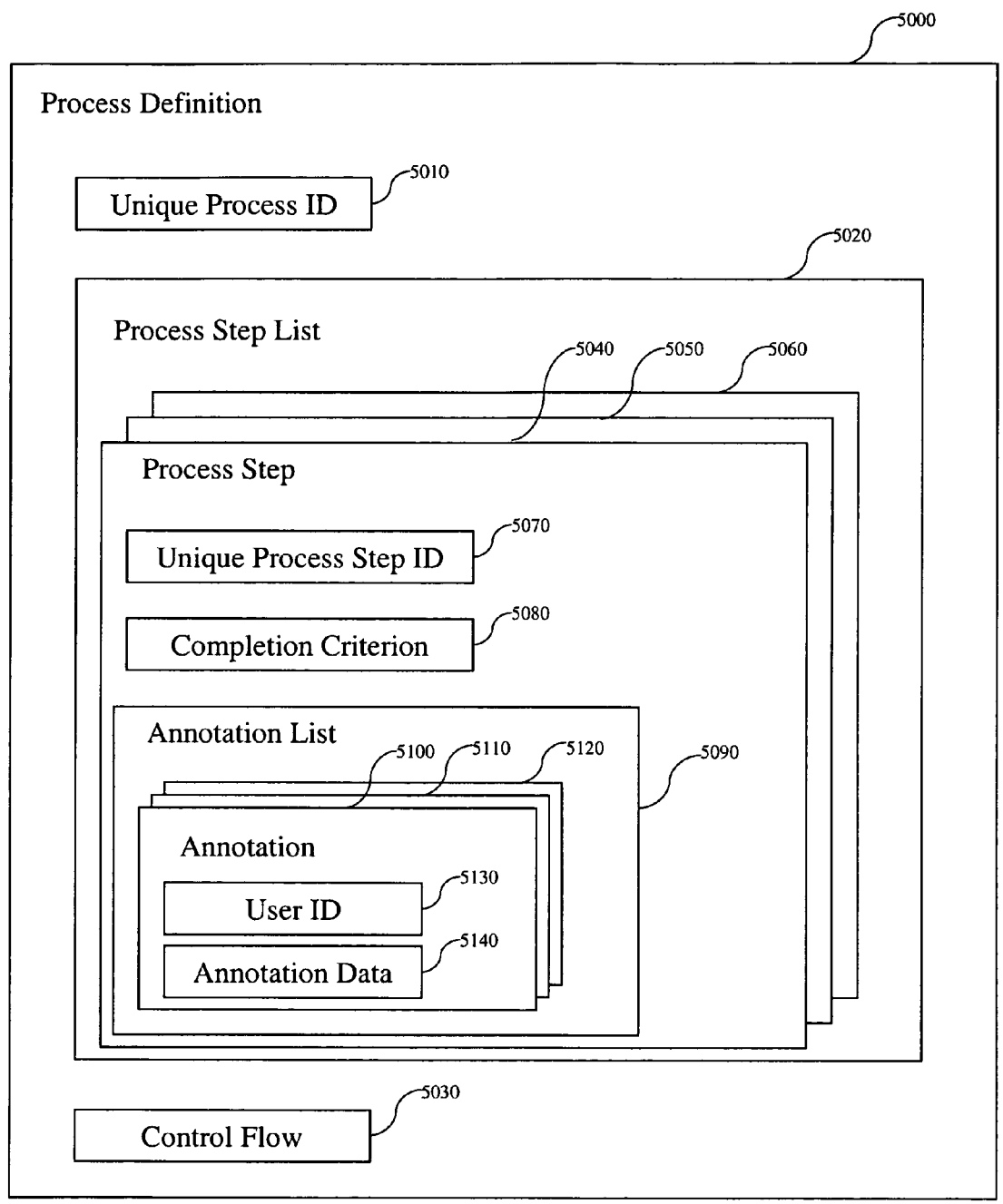
FIG. 5 is a component diagram of the process definition used in the preferred embodiment.

As shown in FIG. 5, a given process definition 5000 provides an operational specification of a given process, that is, it indicates all that is needed for the current invention to track and support the given process. This process definition 5000 includes: (1) a unique process ID 5010, i.e., a unique name for each given process (e.g., "Travel Expense Reimbursement"); and (2) a Process Step List 5020 that includes definitions of all of the given process's 5000 process steps 5040-5060. While the FIG. 5 depicts three process steps 5040-5060, this embodiment is also applicable to any number of steps greater than or equal to one.

A control flow specification indicates the flow of control from one step to the next. For example in this process 5000, the flow might be simply that step 5040 is executed first, followed by 5050, followed by 5060. This embodiment is also applicable to control flows that include nonlinear execution flows (such as that mentioned above), including, but not limited to: Conditionals, i.e., points in the process where the determination of the next applicable process step depends on one or more factors, such as the value of a particular attribute or response; and Repetitions (i.e., for-loops, and while-loops).

Process steps 5040-5060 include: a unique process step ID 5070, i.e., a unique name for each given process, a completion criterion (or criteria) 5080, which describes the step's goal or the conditions that must be met to complete the step. This includes computer actions, like entering one's name and address, as well as non-computer-based states, like having a group of community members reach agreement on a particular issue. Such states have to be signaled using some form of computer recognizable event, e.g., all members voting "yes" in an online vote, one that this embodiment is allowed to monitor.

An annotation list 5090 contains all user's annotations 5100-5120 for the given process step 5040. Although only three annotations 5100-5120 are depicted in FIG. 5, this embodiment is also applicable to any number of annotations greater than or equal to one.

Each annotation, e.g., 5100, includes both the user ID 5130 of the relevant user, as well as the annotation data 5140. Annotation data 5140 includes, but is not limited to data that is displayed when the given process is reached, this data including but not limited to text, graphics, audio, animation, binary, HTTP links, and video. Annotation data 5140 can also include data prompts allowing users to enter information, this information including but not limited to data values, yes/no responses, or the specification of "OK," or "Cancel". The input from an annotation can be used to affect the data being displayed, the process being executed (e.g., using the input as a value used by the process), or to alter the process's control flow 5030 (e.g., terminating a repeating action). The user ID 5130 can also include, but is not limited to the ID of a group (e.g., "managers") and roles (e.g., "project lead" or "doctor on call").

Whenever a user begins running a given process (e.g., Travel Expense Reimbursement) a process instance execution entry is created in the Process Step Annotation Database Server 1010. This process instance execution entry is used to store and supply the current state of the instance, including, but not limited to the currently active process step.

Figure 2:
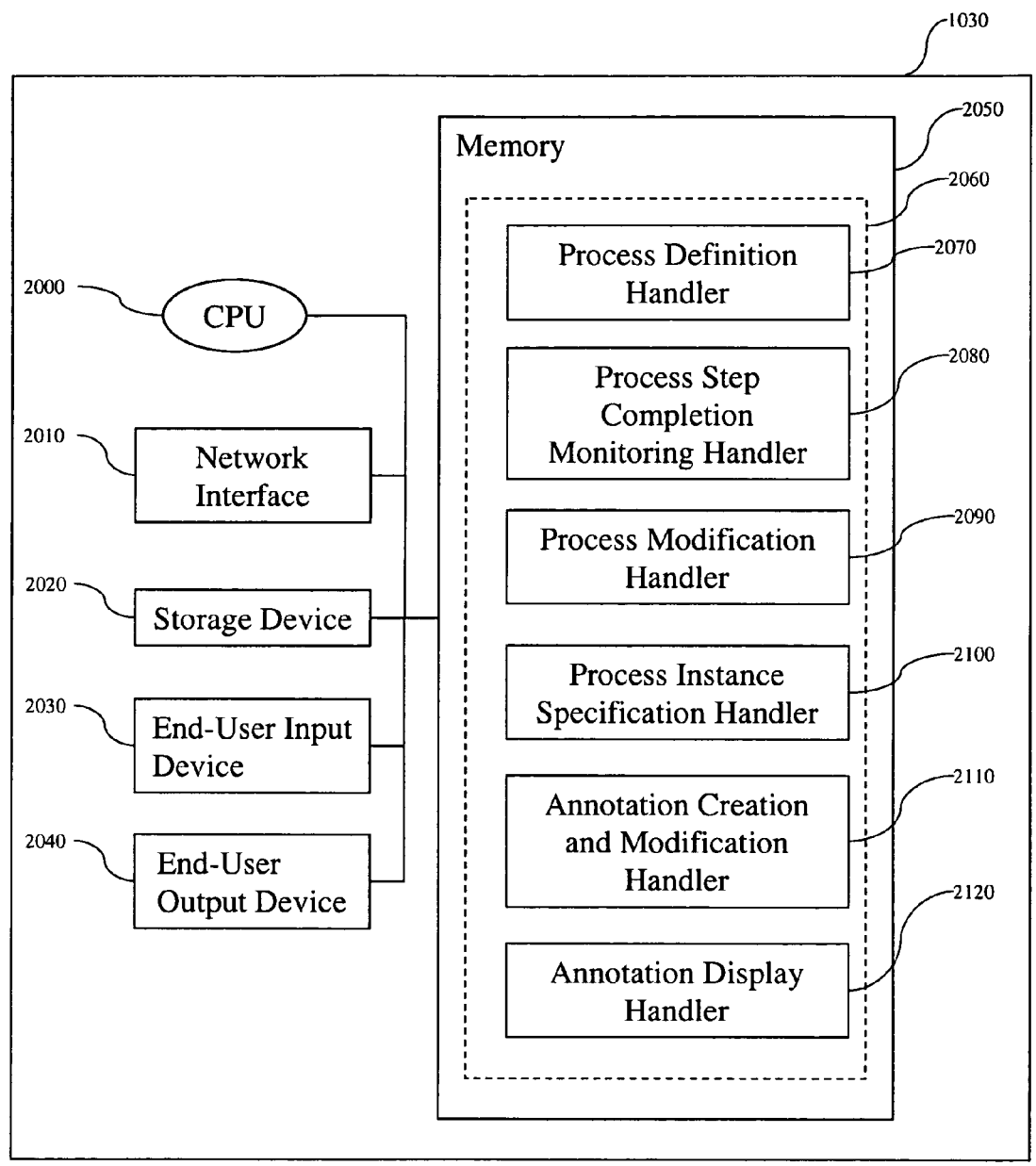
FIG. 2 is a block diagram of a Process Step Annotation Client used in the above embodiment.

FIG. 2 depicts a detailed component diagram of the Process Step Annotation Client 1020, which enables end-users to interact with the current invention. Examples of platforms that support the Process Step Annotation Client 1020 include any device that can execute programmatic code and communicate via the network 1030. Such devices include, but are not limited to, a ThinkPad laptop computer running any suitable operating system such as Windows XP. Clients can also include network-connectable mobile (i.e., portable) devices such as that sold under the trademark Palm or running under Windows CE, as well as smart cellular telephones (i.e., devices which can act as a cellular telephone as well as run network applications), like that sold under the trademark Nokia 90008 by Nokia Corporation. Although only one Process Step Annotation Client 1020 is pictured in FIG. 1, this and other embodiments can include any greater number as well. Also, note that this embodiment includes standalone configurations in which the database provided by the Process Step Annotation Database Server 1010 runs on the same machine as the Process Step Annotation Client 1020. Such standalone configurations eliminate the need for any network communication.

FIG. 2 shows the a Process Step Annotation Client 1030 preferably includes: a CPU 2000, a network interface 2010, including but not limited to Ethernet or wireless IP (e.g., LEAP, CDMA or WAP); a storage device 2020, such as a disk or DASD (direct access storage device); an End-User Input Device 2030, such as a keyboard or touchpad; and an End-User Output Device 2040, such as a display or audio speaker; and a memory 2050, such as RAM.

The network interface 2010 allows the Process Step Annotation Client 1020 to communicate with other network connected nodes—such as the Process Step Annotation Database Server 1010—via the network 1030. According to this embodiment, the Process Step Annotation Client's logic 2060 (which will be discussed in more detail with reference to FIG. 3), is possibly embodied as computer executable code that is loaded from remote source (e.g., over the network 1030 via the network interface 2010), local permanent optical (CD-ROM), magnetic storage (such as disk), or DASD (direct access storage device) 2020 into memory 2050 for execution by CPU 2000. Although FIG. 2 only depicts a single End-User Input Device 2030 and End-User Output Device 2040, this embodiment can include greater numbers as well.

The memory 2050 preferably includes: a Process Definition Handler 2070; a Process Step Completion Monitoring Handler 2080; a Process Modification Handler 2090; a Process Instance Specification Handler 2100; an Annotation Creation and Modification Handler 2110, and an Annotation Display Handler 2120. In one implementation, the handlers 2070-2120 are Socket-based applications which use TCP/IP to communicate with the Process Step Annotation Database Server 1010 via the network 1030 but a skilled practitioner would understand that other communication protocols or handlers (such as web services) are also possible. The Process Definition Handler 2070 allows users to provide processes for others to use and definitions such as those described with reference to FIG. 5.

The Process Step Completion Monitoring Handler 2080 monitors the process step Completion Criterion 5080 to determine whether the currently executing process has been met, signaling the Process Step Annotation Client 1020 when it has. As mentioned with reference to FIG. 5, this may involve watching a given computer input action (e.g., the selecting of an "OK" window button), or watching an online community service to see when all participants have voted. In addition, the Process Step Completion Monitoring Handler 2080 can wait for an end-user working at the Process Step Annotation Client 1020 to select a window-button indicating that the current process step is complete.

The Process Modification Handler 2090 allows end-users to modify the definition 5000 of the process they are currently executing. Such process definitions, as described with reference to FIG. 5, include but is not limited to adding process steps (in addition to 5040-5060) to the process step list 5020, modifying one or more existing process steps (5040-5060), and modifying the control flow 5030.

A Process Instance Specification Handler 2100 allows an end-user to specify the process they either want to begin or continue execution of. In the preferred embodiment, to begin execution of a given process 5000, a given end-user first specifies the unique ID of the process 5010 (e.g., "Travel Expense Reimbursement"), along with their own user ID 5130 (e.g., "user666"). In other embodiments the specification of the user ID 5130 includes some form of verification (e.g., checking that the given user also knows a password associated with the specified user ID) or have identified themselves in some other secure manner, such as using biometrics (e.g., fingerprints). The Process Instance Specification Handler 2100 then checks with the Process Step Annotation Database Server 1010 to see if there already is an execution instance of the given process. If so, then the Process Instance Specification Handler 2100 asks the end-user if they want to run one of the pre-existing instances, or whether they want a new one. They end-user can then either opt to use one of the pre-existing instance or create a new one; in either case, the ID of the relevant execution is returned. If there isn't a pre-existing execution instance, then the Process Instance Specification Handler 2100 has the Process Step Annotation Database Server 1010 create a new instance, and then returns the ID of this new instance.

The Annotation Creation and Modification Handler 2110 allows end-users to both create and modify process step annotations 5100-5120 (described in detail with reference to FIG. 5). The current invention allows a given annotation to be directed at a particular user, this facility enable via the user ID 5130 associated with each annotation 5100-5120. So For example user666 could create annotation shown only to them for process step ps1234 by specifying "user666" as the annotation's user ID. An annotation could also be directed at another user by specifying their used ID. For example, a nurse could leave an annotation for the doctor on call for a given process step by specifying the doctor's ID as the user ID 5130 of the annotation. Skilled artisans will appreciate that a group or role-based user ID could be employed to direct an annotation to one or more users (i.e., those who are either members of the given group or who currently fulfills the current role, e.g., doctor-on-call). A skilled artisan will further appreciate that by specifying that a given annotation be displayed to another user (group or role), the given user could communicate a password required to execute the given process or process step. The invention defined by the claims is also applicable to embodiments in which they are able to directly a given annotation to any and all those who come to a given process step. Methods to indicate this include but are not limited to not specifying any user ID 5130, or specifying some wildcard value, e.g., "*." A skilled artisan will further appreciate that the user ID could also include a regular expression, e.g., "J*Doe" to match any user ID that starts with "*" and ends with "Doe."

The Annotation Display Handler 2120 displays or provides any and all annotations 5100-5120 matching a given process step (e.g., 5040). As described in detail with reference to FIG. 5, in addition to being data (e.g., text, graphics, video, or some executable) that is shown to a given user, an annotation can also include a prompt for data, the input of which is possibly used to effect the given process step 5040 or process 5000. For example, a given annotation could ask a given user whether or nor they want a given input to be translated into an alternative currency. Their response to this prompt would determine the next process step, spec. whether or not a given data value is translated into an alternative currency.

Skilled Artisans will appreciate that more than one annotation might be displayed or provided to a given user executing a given process step. Such would be the case whenever there are more that one annotation matching the user's identity, e.g., user ID="Jane Doe" would be show annotations directly to "Jane Doe," "J*Doe," and "*." Similarly if this user (user ID="Jane Doe") were also the "doctor-on-call" she would be shown those annotations as well.

Figure 3:
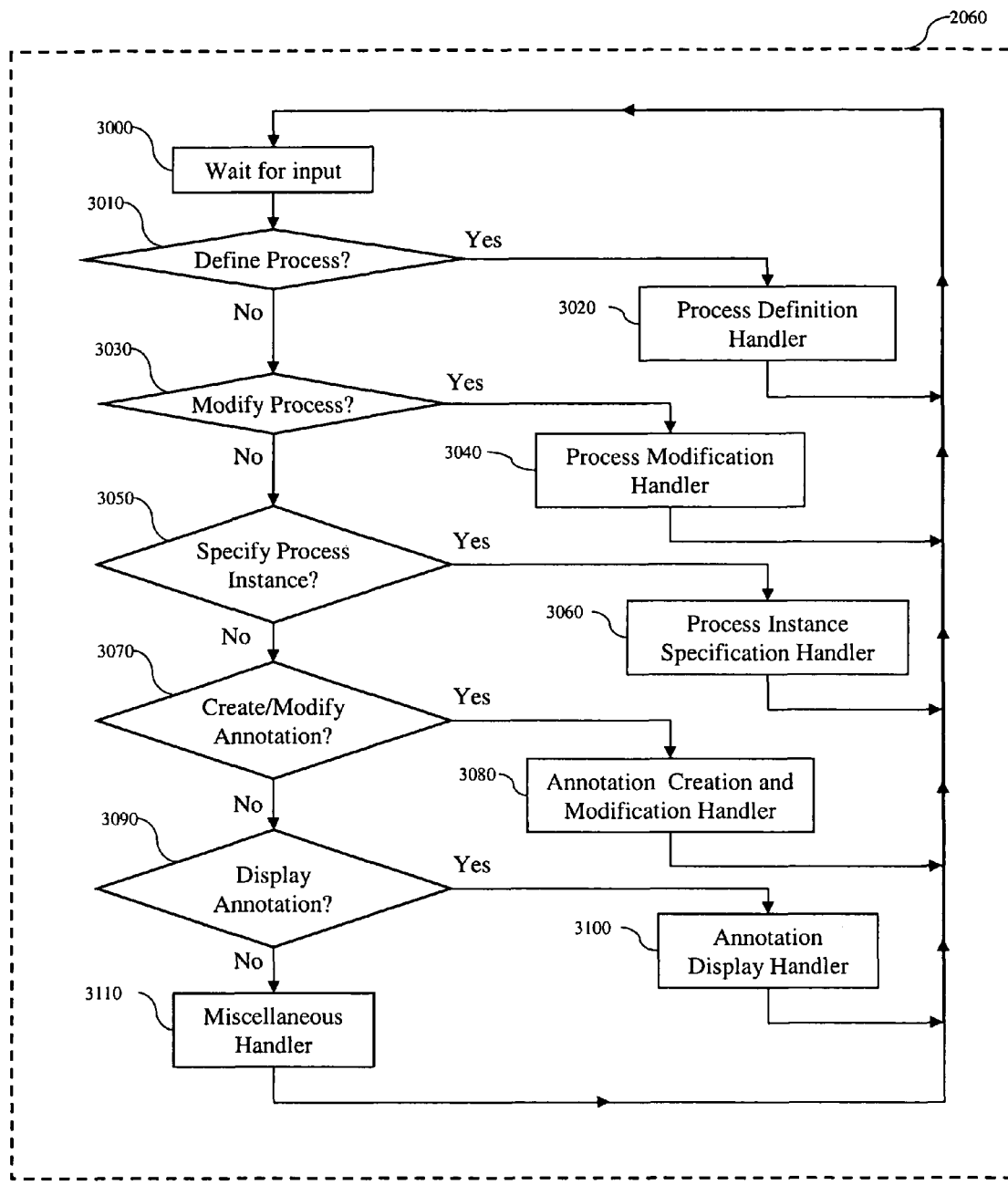
FIG. 3 is a flow chart showing a client control process implemented by the embodiment of the invention.

FIG. 3 shows a detailed flow diagram of the Process Step Annotation Client's logic 2060. As shown, the logic 2060 waits for input in step 3000. The input is checked in step 3010 to determine whether it is a request to define a process. If so, the Process Definition Handler 2070 is invoked in step 3020, following which control continues at step 3000. If not, then the input is checked in step 3030 to determine whether it is a request to modify a process (or process step). If so, the Process Modification Handler 2090 is invoked in step 3040, following which control continues at step 3000. If not, then the input is checked in step 3050 to determine whether it is a request to specify a process execution instance. If so, the Process Instance Specification Handler 2100 is invoked in step 3060, following which control continues at step 3000. If not, then the input is checked in step 3070 to determine whether it is a request to create or modify a process step annotation. If so, the Annotation Creation and Modification Handler 2110 is invoked in step 3080, following which control continues at step 3000. If not, then the input is checked in step 3090 to determine whether it is a signal to display and annotation, e.g., a signal from the Process Step Completion Monitoring Handler 2080. If so, the Annotation Display Handler 2120 is invoked in step 3100, following which control continues at step 3000. If not, then a miscellaneous handler, beyond the scope of the current discussion is invoked in step 3110, following which control continues at step 3000.

In the preferred embodiment, the Process Step Completion Monitoring Handler 2080 is invoked every time a process instance is started, moves from one step to another, or is modified (e.g., by the Process Modification Handler 2090), each invocation including indication of the process instance ID and the current process step id. In this way the Process Step Annotation Client 1020 is able to have the Process Step Completion Monitoring Handler 2080 watch for any and all relevant process-step state information. A completion signal from the Process Step Completion Monitoring Handler 2080 includes both the process instance ID as well the process step ID 5070 (of FIG. 5).

Figure 4:
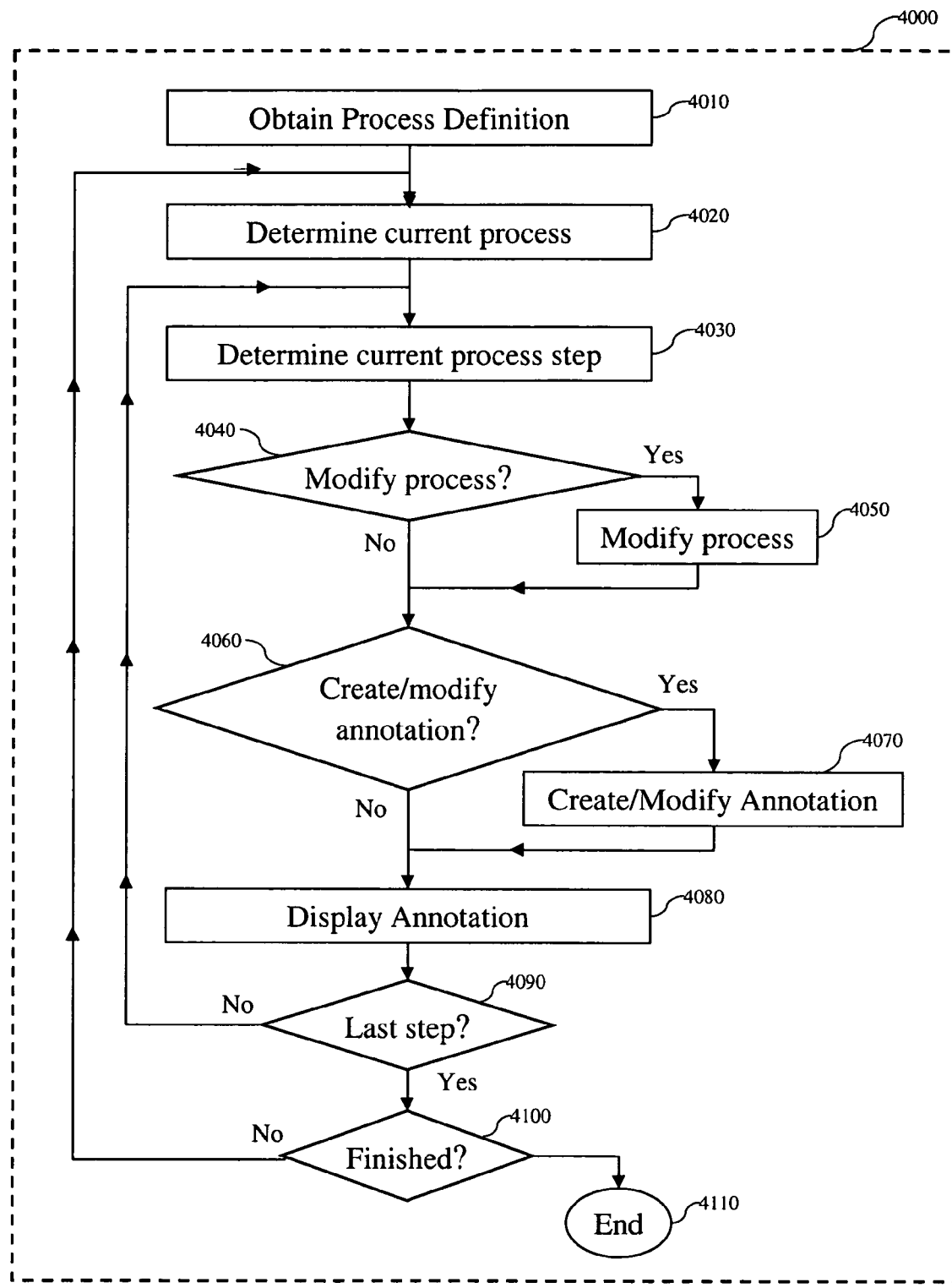
FIG. 4 is a flow chart showing the overall methodology implemented in the embodiment of the invention.

FIG. 4 depicts an overview of a method according to an embodiment of the invention. In this embodiment, the method begins in step 4010 by obtaining a process definition 5000, such a one that provided by an invocation of the Process Definition Handler 2070. This definition is stored in the Process Step Annotation Database Server 1010. Next, in step 4020, the method determines the current process execution instance (e.g., via an invocation of the Process Instance Specification Handler 2100). The current process step is then determined in step 4030 via a lookup in the Process Step Annotation Database Server 1010, using the process instance ID as the key. Step 4040 checks whether the current user wants to modify the current process instance's process definition, doing so, if necessary, in step 4070 via the Process Modification Handler 2090. Step 4060 check whether the current user wants to create or modify the annotation for the current process step, doing so, if necessary, in 4070 via an invocation of the Annotation Creation and Modification Handler 2110. The one or more annotations relevant to the current process step and end-user are then displayed (or provided) in step 4080 via an invocation of the Annotation Display Handler 2120. Step 4090 checks whether this is the last step in the current process control continuing at step 4030 if not. If is the last step, then step 4100 checks whether the current user is finished executing processes, control continuing at step 4020 if not, the method ending at step 4110 otherwise.

A service organization can provide services, using one or more embodiments of the invention, for a customer organization. These services include, but not limited to one or more of the following: (1) assisting and/or teaching one or more members of the customer organization to create personally annotated processes (e.g., via the Process Definition Handler 2070), provision techniques including but not limited to classes and private instruction; (2) assisting and/or teaching one or more members of the customer organization to extend or modify pre-existing annotated process definitions (e.g., via the Process Modification Handler 2090, or the Annotation Creation and Modification Handler 2110), provision techniques including but not limited to classes and private instruction; (3) assisting and/or teaching one or more members of the customer organization to extend or modify pre-existing annotated process instances (e.g., via the Process Modification Handler 2090, or the Annotation Creation and Modification Handler 2110, provision techniques including but not limited to classes and private instruction; (4) assisting and/or teaching one or more members of the customer organization to verify that a pre-existing annotated process definition handles all required situations, assisting and/or teaching members of the customer organization to extend the annotated process definition where this is not the case; (5) providing an annotated process definition for one or more members of the customer organization, the annotations of which the member of the customer organization can either modify or extend; (6) assisting and/or teaching one or more members of a customer organization to combine annotated processes (or sub processes) to create new annotated processes. The service organization could charge the customer organization for the provision of any of the services specified above.

Other embodiments of the invention can take the form of the following methods practiced by a service provider to a client: (1) a method for the provider to assist and/or teach the client to employ to create personally annotated processes; (2) a method for the provider to assist and/or teach the client to extend a pre-existing annotated process; (3) a method for the provider to assist and/or teach the client to verify that a pre-existing annotated process handles all required situations, assisting and/or teaching the client to extend the annotated process where this is not the case; (4) a method for a provider to provide an annotated process for the client, the annotations of which the second user can either modify or extend; (5) a method for the provider to provide an annotated sub process for the client, the annotations of which the client can either modify or extend; (6) a method for the provider to assist and/or teach the client to combine annotated processes to create new annotated processes.

It is to be understood that the provided illustrative examples are by no means exhaustive of the many possible uses for the invention.

It is to be understood that the present invention is not limited to the embodiments described above, but encompasses any and all embodiments within the scope of the following claims. Therefore, while there has been described what is presently considered to be the preferred embodiment, it will understood by those skilled in the art that other modifications can be made within the spirit of the invention.

We claim:

1. A method for enabling a user to dynamically define and modify an annotation corresponding to a step of a process currently executing, the method comprising using a process step annotation client device for:

obtaining a process definition of a currently executing process, wherein the process definition comprises a definition of execution parameters for said current process, wherein the process includes a plurality of user choices;

determining a current process step within the current process;

determining that the user has requested creation of an annotation of the current process step;

receiving information from the user for creating the process step annotation when the user has requested creation of the process step annotation, wherein said information comprises: an identifier of the user, annotation data displayed when the current process step is reached, and data prompts allowing users to input data;

wherein the data that is input from the process step annotation affects a subsequent step in the current process by modifying at least one selected from a group consisting of: data being presented by the current process, a value used by the current process, and a control flow of the current process;

annotating the current process step with the information received from the user such that the process step annotation is presented during execution of the current process step for subsequent executions of the current process;

receiving from the user a response to the process step annotation that affects the control flow of the current process and in response, providing control flow choices to permanently modify the current process;

determining whether the user has requested a modification of the current process;

receiving information from the user for modifying the current process; and calculating one or more values that are fed back into the current process.

2. The method of claim 1 wherein the input from the process step annotation comprises at least one selected from a group consisting of: graphics, text, audio, video, animation, binary, and a hypertext transfer protocol link.

3. The method of claim 2 wherein the input from the process step annotation comprises a password required to execute the current process.

4. The method of claim 1 further comprising presenting the process step annotation to the user.

5. The method of claim 4 further comprising presenting the process step annotation to only the users that are authorized to view the process step annotation during execution of the current process.

6. The method of claim 5 wherein receiving the information from the user comprises receiving a restriction on an entity to whom the process step annotation is presented.

7. The method of claim 1 further comprising executing the current process such that different users execute different steps of the current process.

8. The method of claim 1 further comprising attaching each process step annotation to an entity.

9. The method of claim 1 further comprising associating the process step annotation to a new process step.

10. A computer non-transient storage medium comprising machine executable instructions executed by a programmable information processing system for causing the programmable information processing system to enable a user to dynamically define and modify an annotation corresponding to a step of a process currently executing, by executing steps of:
  obtaining a process definition of a current process, wherein the process definition comprises a definition of execution parameters for said current process, wherein the process includes a plurality of user choices;
  determining a current process step within the current process;
  determining that the user has requested creation of an annotation of the current process step;
  receiving information from the user for creating the process step annotation when the user has requested creation of the annotation, wherein said information comprises: an identifier of the user, annotation data displayed when the current process step is reached, and data prompts allowing users to input data; wherein the data that is input from the process step annotation affects a subsequent step in the current process by modifying at least one selected from a group consisting of: data being presented by the current process, a value used by the current process, and a control flow of the current process;
  annotating the current process step with the information received from the user such that the process step annotation is presented during execution of the current process step for subsequent executions of the current process;
  receiving from the user a response to the process step annotation that affects the control flow of the current process and in response, providing control flow choices to permanently modify the current process;
  determining whether the user has requested a modification of the current process;
  receiving information from the user for modifying the current process; and
  calculating one or more values that are fed back into the current process.

\* \* \* \* \*